United States Patent [19]
Krey et al.

[11] 3,981,449
[45] Sept. 21, 1976

[54] EXHAUST COOLING SYSTEM

[75] Inventors: John F. Krey, North Hollywood;
Ephraim Regelson, China Lake;
John D. Crecelius, Ridgecrest, all of Calif.

[73] Assignee: The United States of America as represented by the Secretary of the Navy, Washington, D.C.

[22] Filed: Jan. 29, 1968

[21] Appl. No.: 703,230

[52] U.S. Cl. ............................................. 239/127.3
[51] Int. Cl.² ........................................ B64D 33/04
[58] Field of Search ......... 239/127.1, 127.3, 265.17; 60/269, 270–271

[56] References Cited
UNITED STATES PATENTS

| | | | |
|---|---|---|---|
| 2,603,060 | 7/1952 | Brown | 239/127.3 |
| 2,630,673 | 3/1953 | Woll | 60/262 |
| 2,631,796 | 3/1953 | Williamson, Jr. et al. | 60/264 |
| 2,840,984 | 7/1958 | Laucher | 239/127.3 |

*Primary Examiner*—Samuel Feinberg
*Attorney, Agent, or Firm*—R. S. Sciascia; Roy Miller; Gerald F. Baker

[57] ABSTRACT

An air intake pressure unit is attached to the exhaust section of a jet engine. The unit comprises several passages which extend out beyond the end of the jet engine and through which passages engine exhaust and cooling air is passed so that cooling air passes over and mingles with exhaust gases from the engine. Construction is such that the lower static pressure formed by the exhaust gases assists in drawing in the cooling air.

1 Claim, 1 Drawing Figure

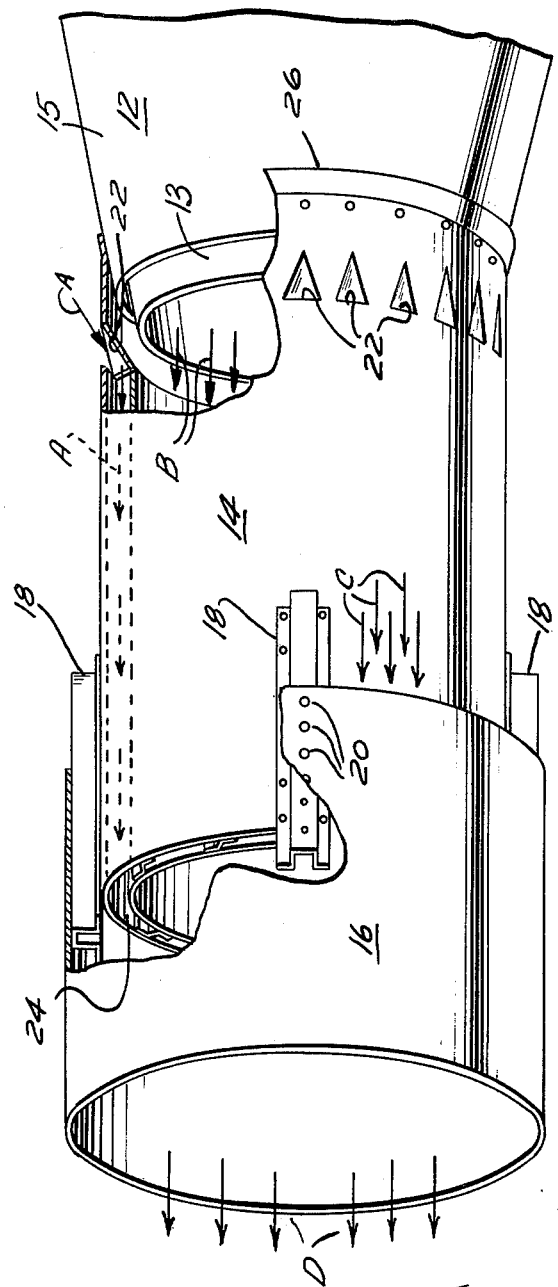

EXHAUST COOLING SYSTEM

GOVERNMENT INTEREST

The invention described herein may be manufactured and used by or for the government of the United States of America for governmental purposes without the payment of any royalties thereon or therefor.

BACKGROUND OF THE INVENTION

Prior attempts have been made to lower the temperature of exhaust gases of jet engines, for example, by utilizing ram recovery and low static pressure produced by the exhaust gases to force and draw cooling air through a cooling system. However, known prior art devices have resulted in inadequate cooling and excessive drag.

SUMMARY

The cooling system according to the present invention functions as an air pump, drawing cooling air through a wall of the system by means of static pressure formed by the exhaust gases being lower than the static pressure in the vicinity of the flush cooling air inlets. An outer shield is attached to the rear of the system and this shield is cooled by the ram air forced between the shield and the cooling system wall. Because no air in the cooling system is required to reverse direction, a greater volume of cooling air may pass through the system with less drag.

BRIEF DESCRIPTION OF THE DRAWING

The single FIGURE of the drawing is a perspective view of a cooling system according to the present invention with parts broken away and partially in section.

DESCRIPTION OF THE PREFERRED EMBODIMENT

As shown on the drawing a jet engine 12 is furnished with the usual tail pipe 13 and shroud 15. The exhaust cooling device according to the present invention comprises a dual walled cooling tube 14, adapted to be fastened to the shroud 15 and a shield member 16 surrounding the rear portion of tube 14 and extending beyond the end thereof to further reduce the heat level of exhaust gases flowing from the engine tail pipe. Tube 14 is a double walled tube to furnish a passageway 24 for cooling air. The outer wall of tube 14 is provided with fresh air inlets 22 just aft of the attachment 26 between the tube and engine 12. The outer shield 16 is fastened to exhaust tube 14, for example, by means of brackets 18. By way of example, the brackets are shown as being fastened to the tube 14 and to the outer shield 16 by means of rivets 20.

OPERATION

Cooling air A is drawn into and through the section 24 formed in the wall of exhaust tube 14 because of the differential pressure between air at A and the exhaust gases B flowing through the inner passage of tube 14 from engine 12. Ram air C is forced through the opening between outer shield 16 and the tube 14. The cooling air from A and C, after passing through the respective passages, combines with the exhaust gases B and the combined gases pass out of the system at D.

As may be seen from the foregoing description, the system according to the present invention utilizes two layers of cooling air to effectively lower the temperature of the exhaust tube 14 and then the two air layers are combined with the exhaust gases resulting in a further lowering of the temperature of the exhaust. The system thus greatly reduces the amount of heat radiation from the vicinity of the exhaust section of the engine.

What is claimed is:

1. An exhaust cooling system attachment for combustion engines having an exhaust tail pipe and a shroud surrounding said pipe; said attachment comprising:
    inner and outer cylindrical wall members forming a dual walled conduit having a longitudinal dimension and a radial dimension;
    a cylindrical shield having a diametral dimension larger than the diametral dimension of the outer wall member of said dual walled conduit and fastened to said outer member in overlapping spaced relationship;
    said walls of said dual walled conduit forming an inner and an outer passageway;
    said dual walled conduit having a plurality of openings in the outer wall thereof to admit cooling air to the forward end of said outer passageway;
    said outer wall attached to said shroud of said engine exhaust system and said inner wall attached to said outer wall near said pipe, whereby exhaust gases flow through the inner passageway;
    said radial dimension of said inner member being substantially constant and commensurate with the terminus of said tail pipe;
    the radial dimension of said outer member being substantially commensurate with the terminus of said shroud; and
    said shield overlapping said conduit from a point rearward of the mean of said longitudinal dimension and extending beyond the terminus of said conduit a distance approximately equal to the overlapping portion so that cooling air will flow between said shield and said tube to provide further cooling of said exhaust gases.

* * * * *